April 8, 1969     H. SKALA ET AL     3,437,601
ZEOLITE REGENERATION PROCESS
Filed Sept. 13, 1965
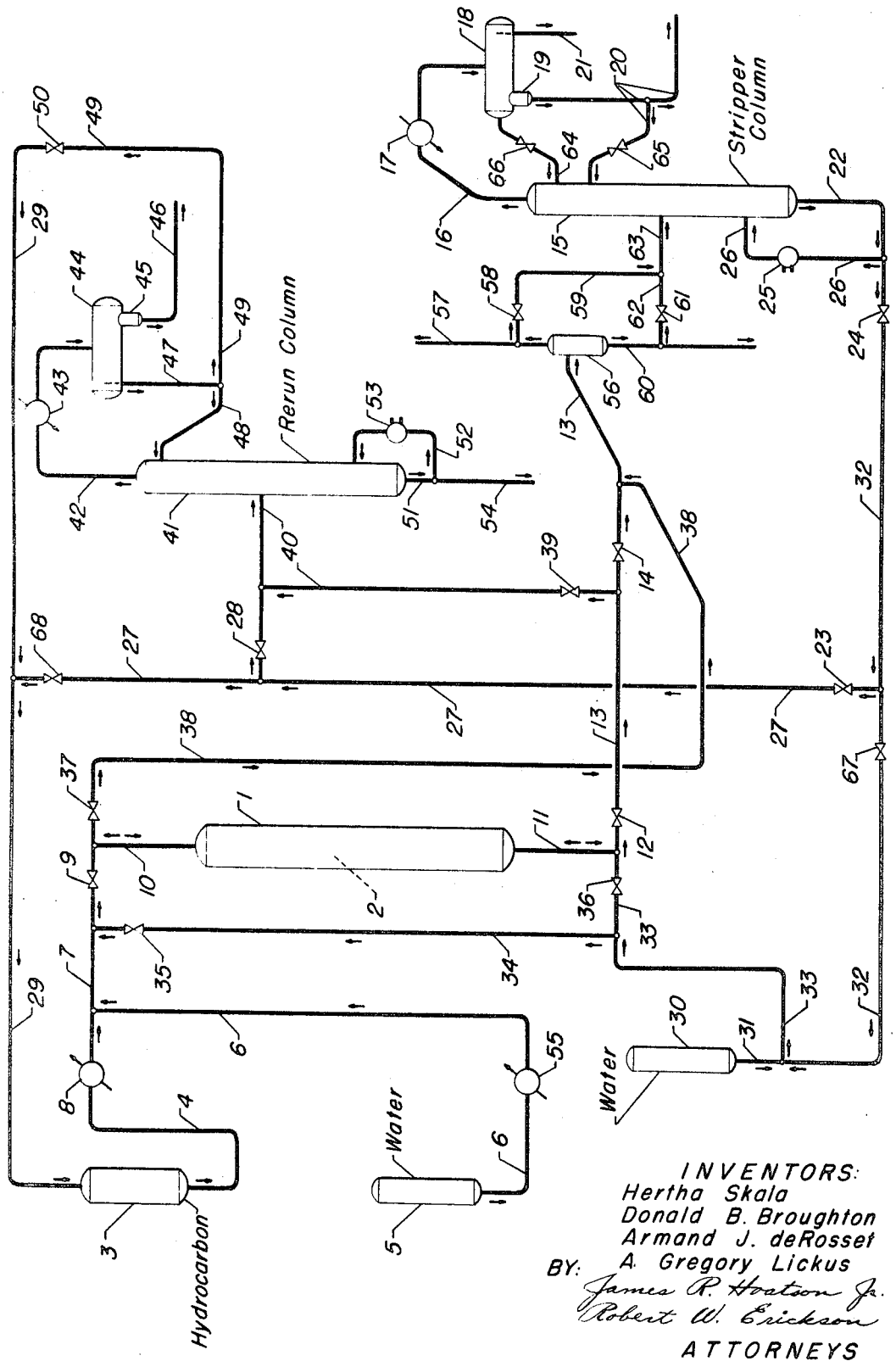
INVENTORS:
Hertha Skala
Donald B. Broughton
Armand J. deRosset
BY: A. Gregory Lickus
James R. Hoatson Jr.
Robert W. Erickson
ATTORNEYS United States Patent Office 3,437,601
Patented Apr. 8, 1969

3,437,601
ZEOLITE REGENERATION PROCESS
Hertha Skala, Lake Zurich, Donald B. Broughton, Evanston, Armand J. de Rosset, Clarendon Hills, and A. Gregory Lickus, Riverside, Ill., assignors to Universal Oil Products Company, Des Plaines, Ill., a corporation of Delaware
Filed Sept. 13, 1965, Ser. No. 486,789
Int. Cl. B01j 11/02
U.S. Cl. 252—414                                7 Claims

ABSTRACT OF THE DISCLOSURE

Zeolites, employed in the separation of straight chain hydrocarbons whereby the capacity and rate of sorption are reduced by the accumulation of impurities, are regenerated. The zeolites are wetted with water diluted with hydrocarbon, then water washed, the water being subsequently displaced with hydrocarbon, and the zeolites dried in the presence of hydrocarbon. The zeolites are not exposed to appreciable amounts of water at temperatures in excess of about 350° F. to obviate hydrothermal damage.

---

This invention relates to a method for regenerating the activity of zeolite sorbents in order to restore the sorbent to an active condition for sorption. More specifically this invention concerns a method to regenerate a fixed bed of deactivated molecular sieves which have been employed in the separation of straight chain hydrocarbons from a feed containing their branched chain isomers and cyclic analogs which comprises: passing a hydrocarbon fluid having water contained therein through the fixed bed of deactivated sieves at a temperature less than about 350° F. until the water content of the sieves are in equilibrium with the water containing hydrocarbon fluid; introducing liquid water through the bed of sieves at a temperature less than about 350° F. to displace the hydrocarbon from the bed; continually passing the liquid water through the bed of sieves at a temperature less than about 350° F. until the sieves are substantially regenerated; after the sieves are substantially regenerated, passing a hydrocarbon fluid through the bed to displace and remove water from the bed while maintaining a temperature below about 350° F. until the water content of the hydrocarbon effluent from the bed is less than a predetermined level and thereupon passing the hydrocarbon fluid through the bed of sieves while increasing the bed temperature to less than 700° F. to lower the water content of the sieves to a predetermined level.

Several sorption-type processes utilizing specific sorbents are known for the separation of compounds on the basis of their molecular structure and/or chemical composition utilizing an inorganic sorbent containing pores in which one or more of the components of the mixture belonging to a particular class of materials is selectively sorbed and retained in the pores of the sorbent but in which one or more components belonging to another class of substances are rejected by the sorbent. The sorbents having such selective sorbency are generally of the inorganic type such as certain specially active carbons, prepared for example by carbonization of acid sludges, specially activated alumina, and a class of zeolite-type sorbents comprising certain metal alumino-silicates, particularly the dehydrated zeolitic cation containing silicates which upon dehydration contain pore entrances of a fixed cross sectional diameter. These cations are generally selected from hydrogen, ammonia, alkali metals and alkaline earth metals. Most zeolites have a high sorbent capacity for polar molecules and some of them have sufficiently small uniform pore entrances to enable them to separate molecules on the basis of their molecular size. These latter zeolites, called molecular sieves, are useful in separations such as straight chain hydrocarbons from their branched chain isomers and cyclic analogs because the cross sectional diameters of said molecular sieve entrances do not permit entry of compounds having larger molecular diameters than the straight chain compounds. Other molecular sieves having larger or smaller pore entrances are also useful in obtaining separations other than straight chain separations. A specific sorbent having molecular sieve properties to separate straight chain components is the calcium alumino-silicate 5 angstrom molecular sieve. The regeneration process described hereinafter is applicable to zeolites and particularly to molecular sieve sorbents used in separation processes. In most of these processes the sorbent gradually becomes reactivated during use while the feed stock is on stream in the separation process as a result of the sorption of polar compounds which contaminate the feed stock or the sorption of higher molecular weight compounds which are retained by the sorbent with greater tenacity than the selectively sorbed component of the feed stock. Thus when using calcium alumino-silicate having pore entrance diameters of about 5 angstrom units for the separation of straight chain hydrocarbons from their branched chain isomers and cyclic analogs, after a period of use the rate and capacity of the sorbent to sorb the straight chain components tends to decrease. Examination of the deactivated molecular sieve indicates that polar compounds and especially those of high molecular weight are responsible for the deactivation. These compounds comprise nitrogen, oxygen and sulfur containing aliphatic, polynuclear and heterocyclic compounds which, because of their polar nature tend to be retained by the sorbent with greater tenacity than the straight chain components of the feed stock. Other polar compounds include the high molecular weight polycyclic aromatic hydrocarbons.

The pore structure of a molecular sieve is composed of a series of interlaced cavities connected by their pore entrances. The pore entrances are of uniform size and in certain applications are responsible for the separation of feed stock components on the basis of molecular size. There are a number of pore entrances on the surface of the sieve and when the polar contaminants adsorb at or near the pore entrance, said compounds can effectively block off the passage of straight chain compounds through the pore entrance. Accordingly, even though there is adequate volume in the internal cavities to sorb straight chain compounds, nevertheless the rate or sorption into the cavities becomes so slow as to render the sieve incapable of practically separating the straight chain component. It is also evident that even a small quantity of polar contaminants can effectively deactivate molecular sieves by strategically locating at the surface pore entrances. Although the concentration of these polar contaminants in the feed stock may be reduced by such pretreating steps as hydrorefining, guard chambers of adsorbent, etc., invariably a small quantity will reach the sorption zone, accumulate on the sieves and eventually deactivate the sieve. Although the sieves may be regenerated by burning the contaminants off in the presence of oxygen, this involves unloading the sieves from the sorption chamber in a commercial contacting zone due to the high temperatures required. Also, such burning procedure may tend to crack and carbonize the sieves and the residue within the pores may tend to resinify or undergo various condensation reactions which can plug the pores and permanently damage the sieves. In the case of a sorption such as that claimed in U.S. Patent No. 2,985,589 wherein straight chain hydrocarbons are separated from their branch chain isomers and cyclic analogs unloading the sieves from the contacting chamber is a costly and slow operation. It is preferable to regenerate the sieves in the contacting chamber while simultaneously restoring their initial rate and capacity to sorb straight chain hydrocarbons.

The patented process above employs a fixed bed of sieves contained within a contacting chamber as well as two fractionators, one to separate the desorbent from the extract stream (the stream rich in straight chain hydrocarbons) and the other to separate the desorbent from the raffinate stream (the stream lean in straight chain hydrocarbons). The desorbent is of a sufficiently different boiling range from the feed stock components as to render it readily separable by ordinary fractionation. The process is operated by continuously introducing the feed into one zone and the desorbent into a second zone of the contacting chamber while simultaneously withdrawing the raffinate from a third zone and the extract from a fourth zone of the contacting chamber, maintaining a continuously circulating stream through the chamber and periodically shifting the point in the contacting chamber into which the feed is introduced while simultaneously shifting the points of introduction of desorbent and withdrawal of raffinate and sorbate. The raffinate stream is sent to a first fractionator wherein the feed stock components are separated from the desorbent components and the desorbent components are recycled to the contacting chamber. The extract stream is sent to a second fractionator wherein the feed stock components are separated from the desorbent components and the desorbent components are recycled to the contacting chamber. These two fractionators are effectively utilized in the regeneration process of this invention described hereinafter.

It is an object of this invention to regenerate deactivated zeolites.

It is another object of this invention to substantially restore the rate and capacity of molecular sieves to sorb straight chain hydrocarbons from fluid hydrocarbon mixtures.

It is a more specific object of this invention to regenerate molecular sieves in a contacting chamber without having to remove them from the chamber.

It is another specific object of this invention to develop a specific regeneration procedure to efficiently and economically remove polar compounds from molecular sieves and thereby restore the sieves capacity to function in separating straight chain hydrocarbons from a feed containing their branched chain isomers and cyclic analogs.

It is still another specific object of this invention to develop a specific regeneration procedure to reactivate molecular sieves which have been deactivated by the accumulation of polar compounds thereon by washing with a liquid containing water under specific circumstances to avoid hydrothermally damaging the sieves.

The accompanying drawing shows the overall flow scheme containing the various pieces of equipment to carry out the process of this invention. Contacting chamber 1 contains a fixed bed of molecular sieves 2. The chamber may contain a continuous fixed bed of sieves or alternately and more preferably a series of fixed beds are positioned along the length of chamber 1 such as that shown in U.S. Patent No. 2,985,589. For purposes of this description, it is assumed that the chamber has been employed in separating straight chain hydrocarbons from a feed stock as described in said patented process and the sieves have become deactivated (the rate of exchange between the feed straight chain components and the desorbent straight chain components has become slow). Although the regeneration procedure may be directly started in the presence of the feed and desorbent hydrocarbon, preferably the feed and desorbent hydrocarbons are first removed from the contacting chamber. This is readily accomplished by flushing out the feed and desorbent with another hydrocarbon fluid. In many cases it is desirable only to remove the feed hydrocarbons from the contacting chamber and this is conveniently accomplished by entirely displacing the feed with desorbent. Although any hydrocarbon may be satisfactorily employed for flushing, we prefer a light hydrocarbon selected from the group consisting of butane, pentane and hexane. The equipment shown in the drawing employs a hydrocarbon fluid contained in vessel 3 as the flushing medium and the feed and desorbent are removed from chamber 1 by passing the hydrocarbon fluid out of surge vessel 3 through flow conduit 4, through heater 8, flow conduit 7, valve 9, flow conduit 10 and into chamber 1 thereby displacing the feed and desorbent. The displaced material including the hydrocarbon fluid, desorbent and feed is withdrawn from chamber 1 through flow conduit 11 where it passes through valve 12, flow conduit 13, valve 39, flow conduit 40 and finally into rerun column 41. The rerun column is operated to separate the hydrocarbon fluid from the feed and desorbent (the fluid generally being of lower boiling point) and accordingly the overhead vapor comprising hydrocarbon fluid is removed from column 41 through flow conduit 42, where it passes through condenser 43 and into overhead receiver 44. The hydrocarbon fluid is withdrawn from receiver 44 through flow conduit 47 where a portion is returned to column 41 by means of flow conduit 48 as reflux and the remaining portion is recycled to surge vessel 3 by flowing through flow conduit 49, valve 50, flow conduit 29, and into vessel 3. The feed and desorbent components are removed from column 41 through flow conduit 51 where a portion is returned to column 41 through flow conduit 52 and reboiler heater 53 while the remaining portion is withdrawn through flow conduit 54. This particular arrangement permits the complete recovery of the hydrocarbon fluid that mixes with the feed and desorbent. Alternately, the desorbent may be employed to displace the feed components from chamber and subsequently the light hydrocarbon is employed to displace the desorbent in the same manner as described above. In those cases in which the desorbent is itself a light hydrocarbon, it is not necessary to employ a separate light hydrocarbon fluid for the desorbent itself can function in place of the hydrocarbon fluid. Also, when chamber 1 is operating to separate the straight chain components from the feed the temperatures of the sieves are generally maintained at from about 300° F. to about 550° F. It is preferable that the temperatures be reduced to less than 350° F. and preferably about 250° F. before the hydrocarbon fluid is introduced into the chamber. The hydrocarbon fluid preferably contains an appreciable concentration of straight chain components preferably within the range of from about 5% to about 100%, and preferably is hydrorefined to insure the absence of any undesirable contaminants.

After the flushing step, the bed of sieves are ready to be regenerated. Since the ultimate object of the regeneration procedure is to wash the polar compounds off the sieves with liquid water, it is first necessary to wet the sieves with water. However if the sieves are exposed to water at temperatures much in excess of 350° F., the molecular sieve structure will be hydrothermally damaged. When water is contacted with relatively dry sieves, there is a strong tendency for the sieves to adsorb water, giving off heat due to the heat of adsorption. This evolved heat will raise the temperature of the sieves and thus create a possibility of hydrothermally damaging the sieves. Accordingly, the manner under which the sieves are first exposed to water is an important step in this process. We prefer the use of the hydrocarbon fluid as a heat adsorbing diluent along with water when first contacting the sieves with water in a wetting step. Preferably the hydrocarbon fluid containing uniformly distributed water is passed through the fixed bed of sieves to assure uniform contact of water with the sieves without excess temperature rise. This is conveniently accomplished by vaporizing the water, vaporizing the light hydrocarbon and combining the vapors in a predetermined concentration and passing the vapor mixture through chamber 1 until the concentration of water in the mixture flowing in flow conduit 11 is substantially the same as the concentration of water in the mixture flowing in flow conduit 10. This wetting step may also be accomplished by contacting the sieves with liquid hydrocarbon containing dissolved water or with liquid hydrocarbon containing suspended water. The water concentration in the hydrocarbon fluid and the sieve bed temperatures are important variables in this wetting step. Although water concentration as high as 50% may be employed, preferably the water concentration is less than 10% by weight and especially preferably less than 5% by weight. The maximum temperature in the sieve bed should not exceed about 350° F. during the wetting step to avoid hydrothermal damage of the sieves. Preferably the temperature during the wetting step is maintained at about 250° F. to insure a safe margin to prevent hydrothermal damage. The temperature of 350° F. is an important factor and although the exact number of 350 may be varied by a few ° F. nevertheless the number is selected to insure a safe margin to prevent hydrothermal damage. It has been observed that hydrothermal damage occurs at 400° F. but not at 350° F. The chamber is preferably operated at relatively low pressures and temperatures of about 250° F. when wetting the sieves with vaporized hydrocarbon fluid and water. A convenient pressure is about 50 p.s.i.g. The vapor phase wetting is preferred since water has a very low solubility in light liquid hydrocarbons. Referring to the drawing, the hydrocarbon fluid is introduced into the sieve bed in the vapor phase, by passing out of vessel 3, through flow conduit 4, heater 8, flow conduit 7, valve 9 and into conduit 10. Water is passed out of surge vessel 5 through flow conduit 6, heater 55 into flow conduit 7 and continues along with the hydrocarbon into chamber 1. Heaters 8 and 55 are employed to vaporized the hydrocarbon fluid and water respectively. The effluent from chamber 1 is withdrawn through flow conduit 11, valve 12, flow conduit 13, valve 39, flow conduit 40 and into rerun column 41. The hydrocarbon fluid is recovered and recycled to vessel 3 as described hereinbefore. This wetting step is preferably continued until the water content of the sieves is in equilibrium with the wet hydrocarbon (i.e., when the water concentration in flow conduit 10 is about equal to that in flow conduit 11).

After the wetting step is completed the sieves are ready to be washed with a liquid containing water. This is preferably initiated by raising the chamber pressure to a sufficiently high pressure to maintain water in the liquid phase at the temperatures employed and passing liquid water upflow through chamber 1. Alternately the washing step is accomplished by passing a suspension of liquid water and hydrocarbon through the bed of sieves. Water is withdrawn from vessel 30 through flow conduit 31 where it passes through flow conduit 33, valve 36, flow conduit 11 and into chamber 1. The water passes upflow through the fixed bed of sieves and displaces the hydrocarbon fluid from chamber 1. When the water is first introduced into chamber 1, the temperature is preferably maintained below about 200° F. to insure safe margin in preventing hydrothermal damage. The effluent is withdrawn through flow conduit 10, valve 37, flow conduit 38, flow conduit 13, and into separation vessel 56 where the water and light hydrocarbon are separated by forming two phases. The sieve bed temperature is preferably maintained at about from 100° F. to about 350° F. during the washing step and the water is preferably deionized or distilled. Once the liquid water has displaced the light hydrocarbon, it is preferable to switch to a downflow water wash since this will permit higher velocities to pass through the sieve bed without lifting the sieves and thereby avoid shifting sieves, screens, and holding means within the chamber. Generally it is preferable to pass a predetermined volume of water through the sieve bed during the washing step and by passing the water downflow the time for water washing is reduced. Said predetermined volume is preferably selected from about 1 volume of water per volume of sieves to about 25 volumes per volume of sieves. The downflow water washing is accomplished by withdrawing water from vessel 30 whereupon it passes through flow conduit 31, flow conduit 33, flow conduit 34 (valve 36 being closed), valve 35, flow conduit 7, valve 9, flow conduit 10 and finally into chamber 1. In order to pass substantial volumes of water through chamber 1 in commercial sized equipment, it is economically preferable to recover the water for subsequent reuse. This is accomplished by withdrawing the water wash effluent from chamber 1 through flow conduit 11 whereupon the effluent passes through valve 12, flow conduit 13, valve 14, vessel 56, flow conduit 60, valve 61, flow conduit 62, flow conduit 63 and finally into stripper column 15. This water wash effluent contains some of the polar compounds and it is necessary to remove these compounds from the water before reusing the water. It has been found that when the water is introduced into a stripping operation and about 5% of the introduced water is removed overhead, the heavier polar compounds will also pass out in the overhead stream. Therefore, it is not necessary to vaporize the entire water effluent to remove the polar compounds. Column 15 acts as a steam stripper, thereby carrying out the polar compounds along with steam through flow conduit 16, where the overhead stream passes through condenser 17 and into overhead receiver 18. A portion of the water is returned from receiver 18 through boot 19, flow conduit 20 and valve 65 to column 15 as reflux while the remaining net overhead stream is removed through flow conduit 21. The net overhead water stream contains a high carbonyl concentration and comprises about 5% by volume of the charge to the stripper. The bottoms from the stripper is withdrawn through flow conduit 22 where a portion flows through flow conduit 26, and reboiler 25 before returning to stripper 15. The net bottoms portion flows through valve 24, flow conduit 32 where it is recycled either back to vessel 30 or to chamber 1. If desired, the recycle water is filtered to remove any solids or corrosion products such as rust before returning to chamber 1.

After the predetermined volume of water has passed through the bed of sieves, it is necessary to dry the sieves sufficiently to return them to their initial water content when separating straight chain components. Again the sieves cannot just be heated to drive off the water due to the danger of hydrothermal damage. Furthermore, the polar compounds have a low solubility in the water phase and although they are effectively washed off the sieves they still may exist in other places in chamber 1. Accordingly it is preferable to displace the water from chamber 1 with the dry hydrocarbon fluid, thereby carrying away the residual polar compounds (which are soluble in said hydrocarbon fluid) and thereafter gradually increasing the temperatures to dry the sieves in the presence of the hydrocarbon fluid to a predetermined water content. Preferably the hydrocarbon fluid is passed downflow as described hereinbefore while maintaining the sieve bed at a temperature of less than 350° F. to displace the water from chamber 1. The effluent from this displacing step which contains water and light hydrocarbon is withdrawn from flow conduit 11, where it flows through valve 12, flow conduit 13, valve 14, and into vessel 56, wherein the water and hydrocarbon are allowed to separate into different phases. The wet hydrocarbon phase is withdrawn out of flow conduit 57 where it flows through valve 58, flow conduit 59, flow conduit 63, and into stripper column 15 while the water is removed through flow conduit 60. The stripper is employed to remove the remaining water from the hydrocarbon phase and is operated to remove about 5% of the material in flow conduit 63 overhead which is sufficient to dry the hydrocarbon fluid. The overhead from stripper 15 is withdrawn through flow conduit 16, condenser 17 and into overhead receiver 18. Liquid water is remover from receiver 18 through boot 19 and out flow conduit 20 (valve 65 being closed). The hydrocarbon is returned from receiver 18 to column 15 as reflux by passing through valve 66 and flow conduit 64. Dry light hydrocarbon is removed from the bottom of the stripper through flow conduit 22 where a portion flows through flow conduit 26 and reboiler heater 25 before returning to the stripper. The remaining portion of dry light hydrocarbon flows through valve 24 and flow conduit 32. In this particular step the high boiling polar compounds being soluble in the light hydrocarbon cannot be readily stripped out of the hydrocarbon stream. Accordingly, it is necessary to rerun the stripped dry light hydrocarbon before recycling back to chamber 1. Accordingly, valve 67 is closed and valve 23 is opened which routes the dry hydrocarbon through flow conduit 27 and valve 28 into rerun column 41 (valve 68 being closed). The rerun column is operated to remove the polar compounds out the bottom of the column and this is accomplished by withdrawing a 5% bottoms stream through flow conduit 54. The clean dry light hydrocarbon is recycled back to vessel 3 by means of flow conduit 49, valve 50 and flow conduit 29. The stripping and rerunning operation is continued until a predetermined volume of clean dry hydrocarbon fluid has passed through chamber 1 to insure that all the polar compounds have been removed from chamber 1. This predetermined volume is preferably from about 1 volume of hydrocarbon fluid per volume of sieves to about 10 volumes of hydrocarbon fluid per volume of sieves. After passage of this volume of hydrocarbon fluid, all the polar compounds will be flushed out of chamber 1. At this point the rerunning operation is stopped by closing valve 28 and opening valve 68 thereby bypassing rerun column 41. In the foregoing step, the order of stripping first and rerunning second may be reversed to accomplish the same result, although preferably the rerunning is accomplished first.

After the rerun column has been bypassed, dry hydrocarbon fluid is continually passed downflow through chamber 1 preferably in the vapor phase until the amount of water leaving the overhead through flow conduit 20 is less than about 1 percent by weight of the amount of said passed hydrocarbon fluid. The vapor phase is attained by reducing the chamber pressure to about 50 p.s.i.g. and maintaining the chamber temperature at least at about 250° F. When the water leaving flow conduit 1 is less than about said 1%, the temperatures in chamber 1 are increased slowly preferably at a rate of about 25° F./hr. until a sufficiently high temperature has been attained to dry the sieves to a predetermined water content. The sieves are generally dried to less than 2 wt. percent water and this number is readily attained by raising the temperatures up to as high as 700° F. and holding the temperatures there for a few hours. Preferably the sieves are heated to a temperature of from about 400° F. to about 600° F. depending upon the desired residual water content of the sieves. It is important that the sieves be increased in temperature slowly and as long as the amount of water leaving flow conduit 20 is less than said 1% by weight the temperature may be steadily increased. If the water leaving flow conduit 20 exceeds the 1% figure, the temperatures should be held constant until the amount of water drops below said 1%. When the temperatures have reached the desired maximum temperature, the chamber is preferably maintained at the condition for a period of from about 1 hour to about 24 hours. At this point the sieves are fully regenerated and dried and suitable for use in the separation of straight chain components. The chamber and sieves are then allowed to cool off and the process equipment is prepared for start up.

Example

Molecular sieves, having pore entrances of about 5 angstrom units, are loaded into contacting chamber 1. A kerosenne containing hydrocarbon from about 10 carbon atoms per molecule to about 16 carbon atoms per molecule ($C_{10}$–$C_{16}$) is employed as the feed stock. The feed stock contains about 20 wt. percent normal paraffins, about 12 wt. percent aromatics with the remainder being isoparaffins and naphthenes. An Engler distillation of the feed stock shows an initial boiling point of about 370° F. and an end point of about 480° F. The process is operated to separate the straight chain paraffins from the feed stock by their selective sorption in the pore entrances of the molecular sieves. A desorbent in the $C_7$–$C_8$ carbon number range and containing about 50% normal paraffins is employed to displace the selectively sorbed feed stock components in the desorption zone. A raffinate stream comprising non-sorbed feed stock components and desorbent is withdrawn from the downstream point of the sorption zone and routed to a raffinate fractionator to separate the feed stock components from the desorbent whereupon the desorbent is recycled to the contacting chamber. An extract stream comprising selectively sorbed feed stock components and desorbent is withdrawn from the downstream point of the desorption zone and routed to an extract fractionator to separate the feed stock components from the desorbent whereupon the desorbent is combined with the raffinate fractionator desorbent and thereafter recycled to the contacting chamber. Feed stock is continually introduced into the contacting chamber and raffinate and extract is continually withdrawn from the contacting chamber until a total sieve life of about 70 gallons of feed stock per pound of sieves is attained. During this time the recovery of the normal paraffins from the feed stock in the extract at a constant normal paraffin purity in the extract is steadily decreased. At a sieve life of 72.98 gallons per pound the normal paraffin purity of the extract stream (after the desorbent is removed) is 98.3 wt. percent and the total recovery of the normal paraffins in the feed stock is 64.0 wt. percent.

Shortly after the above results are obtained the feed stock is cut out and process is shut down. The equipment is arranged substantially as shown in the accompanying drawing. The extract fractionator is employed as the rerun column and the raffinate fractionator is employed as the stripping colum. The sieves are thereupon regenerated in the following manner: The feed stock is stopped and desorbent is employed to displace the feed from the chamber at 450° F.; pentane is employed to displace desorbent from the chamber at 250° F.; the chamber is depressured to 50 p.s.i.g. and pentane containing about 1.4 wt. percent water is passed downflow through chamber 1 in the vapor phase at a temperature of about 250° F. until the sieves are substantially at equilibrium with the wet pentane; the chamber is repressured to about 250 p.s.i.g. and liquid water is introduced upflow through the bed of sieves at a temperature of about 200° F. to displace the pentane; the liquid water is then run downflow through the bed until about 16 volumes of liquid water per volume of sieves are passed through the bed while stripping the water effluent and recycling the stripped water to the chamber; the pentane is passed downflow through the bed at 250° F. and about 250 p.s.i.g. to displace the liquid water from the bed while stripping and rerunning the wet pentane and recycling the stripped and rerun pentane until about 5 volumes of pentane per volume of sieves are passed through the bed; depressuring the chamber to about 50 p.s.i.g., passing dry pentane through the chamber, stripping the pentane effluent and recycling the dry stripped pentane to the chamber while increasing the temperatures in the chamber up to 450° F. at a rate of no more than about 25° F./hr. and maintaining the 450° F. temperature for a period of 12 hours; cooling the sieves back down to room temperature and reconnecting the process equipment back for normal operation.

The same feed stock is introduced into the upstream point of the sorption zone of chamber 1 and the entire process is operated at substantially the same operating conditions as employed in the pre-regeneration period. After the process has been lined out a material balance is performed around the plant and the results show that the normal paraffin purity of the extract stream (after the desorbent is removed) is 98.1 wt. percent and the total recovery of the normal paraffins in the feed stock is 99.1 wt. percent. By comparing these results with the pre-regeneration results it is apparent that the regeneration procedures has reactivated the sieves to the point of increasing the recovery of normal paraffins from 64.0 wt. percent to 99.1 wt. percent at substantially the same purity.

We claim as our invention:

1. A method to regenerate a fixed bed of molecular sieves which have been employed in the separation of straight chain hydrocarbons from a feed containing their branched chain isomers and cyclic analogs which comprises:

passing a light hydrocarbon fluid containing water through the fixed bed in the vapor phase at a temperature less than 250° F.;

introducing liquid water through the bed of sieves at a temperature less than about 200° F. to displace the light hydrocarbon and continuing the passage of liquid water through the fixed bed at a temperature less than 350° F. until from about 1 to about 25 volumes of water per volume of sieves has passed through the bed; thereafter passing a hydrocarbon fluid through the bed to displace the liquid water from the bed while maintaining a temperature below about 350° F. until the water content of the hydrocarbon effluent is less than about 1 wt. percent;

thereupon continually passing a light hydrocarbon fluid in the vapor phase through the bed of sieves while increasing the temperature up to as high as 600° F.

2. A method to regenerate a fixed bed of molecular sieves which have been employed in the separation of straight chain hydrocarbons from a feed containing their branched chain isomers and cyclic analogs which have been deactivated by the accumulation of contaminants thereon which comprises:

flushing out the feed hydrocarbons from the bed of sieves with a light hydrocarbon fluid containing at least one normal paraffin selected from the group consisting of butane, pentane, and hexane;

passing the light hydrocarbon fluid containing water through the fixed bed in the vapor phase at a temperature less than 250° F. until the water content of the sieves are in equilibrium with the water containing hydrocarbon fluid;

introducing liquid water upflow through the bed at a temperature less than about 200° F. to displace the light hydrocarbon fluid from the bed;

passing said liquid water downflow through the bed at a temperature below 350° F. until the contaminants have been substantially washed off the sieves;

thereupon passing the light hydrocarbon fluid downflow through the bed to displace the water therefrom until the water content of the effluent light hydrocarbon fluid is below about 1 wt. percent; and thereafter passing the light hydrocarbon fluid through the bed of sieves in the vapor phase while increasing the bed temperatures up to as high as 600° F.

3. A method to regenerate a fixed bed of molecular sieves deactivated by the accumulation of contaminants thereon which have been employed in the separation of straight chain hydrocarbons from a feed containing their branched chain isomers and cyclic analogs in which a fluid hydrocarbon desorbent is used which comprises:

flushing out the feed and desorbent hydrocarbons from the bed of deactivated sieves with a light hydrocarbon fluid containing at least one normal paraffin selected from the group consisting of butane, pentane, and hexane;

passing the light hydrocarbon fluid containing water through the fixed bed in the vapor phase at a temperature less than 250° F., introducing the hydrocarbon fluid effluent into a rerun fractionation column, rerunning the hydrocarbon fluid, adding water to the rerun hydrocarbon fluid and recycling the water containing hydrocarbon fluid back to the fixed bed until the water content of the sieves are substantially in equilibrium wtih the water content of the hydrocarbon fluid;

introducing liquid water upflow through the bed at a temperature less than about 200° F. to displace the light hydrocarbon fluid from the bed;

passing liquid water through the bed at a temperature less than 350° F., introducing the liquid water effluent from the bed into a stripping fractionation column, stripping the water, and recycling the water back to the fixed bed until about 16 volumes of water per volume of sieves has passed through the bed;

introducing the light hydrocarbon fluid through the fixed bed at a temperature less than 350° F. to displace the liquid water from the fixed bed;

passing the light hydrocarbon fluid through the bed at a temperature less than 350° F., introducing the hydrocarbon fluid effluent from the bed into the stripping column, stripping the fluid, introducing the stripped fluid into the rerun column, rerunning the stripped fluid and recycling the stripped and rerun hydrocarbon fluid to the bed until from about 1 to about 10 volumes of fluid per volume of sieves has passed through the bed;

stopping the rerunning operation and continuing passing the light hydrocarbon fluid through the bed, stripping the effluent fluid and recycling the stripped fluid to the bed until the water content of the hydrocarbon effluent from the bed is less than about 1 wt. percent; and passing the light hydrocarbon fluid through the bed of sieves in the vapor phase while increasing the bed temperature up to as high as 600° F., introducing the hydrocarbon fluid effluent from the bed into the stripping column stripping the fluid and recycling the stripped hydrocarbon fluid to the bed to lower the water content of the sieves.

4. The method of claim 3 further characterized in that after the water content of the hydrocarbon effluent is less than about 1 percent by weight, the bed temperatures are increased at a rate not exceeding about 25° F. per hour to maintain the water content of the hydrocarbon fluid effluent below about 1 percent by weight.

5. A method to regenerate a fixed bed of molecular sieves deactivated by the accumulation of contaminants thereon which have been employed in a process for the separation of straight chain hydrocarbons from a feed containing their branched chain isomers and cyclic analogs in which a fluid hydrocarbon desorbent is used, said process having two fractionating columns to separate the desorbent from the feed components in the predominantly straight chain extract and the predominantly non-straight chain raffinate which method comprises:

flushing out the feed and desorbent hydrocarbons from the bed of deactivated sieves with a light hydrocarbon fluid containing a normal paraffin;

passing the light hydrocarbon fluid containing less than about 5 wt. percent of water through the fixed bed in the vapor phase at a temperature less than 250° F., introducing the hydrocarbon fluid effluent into one of the fractionating columns operated as a rerun column, rerunning the hydrocarbon fluid, adding sufficient water to the rerun hydrocarbon fluid to return the water content to less than about 5 wt. percent and recycling the water containing hydrocarbon fluid back to the fixed bed until the water content of the sieves are substantially in equilibrium with the water content of the hydrocarbon fluid;

introducing liquid water upflow through the bed at a temperature less than about 200° F., to displace the light hydrocarbon fluid from the bed;

passing liquid water downflow through the bed at a temperature less than about 350°F., introducing the liquid water effluent from the bed into the other fractionating column operated as a stripping column, stripping the water, and recycling the water back to the fixed bed until 16 volumes of water per volume of sieves has passed through the bed;

introducing the light hydrocarbon fluid downflow through the fixed bed at a temperature less than about 350° F. to displace the liquid water from the fixed bed;

passing the light hydrocarbon fluid through the bed at a temperature less than about 350° F., introducing the hydrocarbon fluid effluent from the bed into the stripping column, stripping the fluid, introducing the stripped fluid into the rerun column, rerunning the stripped fluid and recycling the stripped and rerun hydrocarbon fluid to the bed until about 5 volumes of fluid per volume of sieves has passed through the bed;

thereafter passing the light hydrocarbon fluid through the bed, stripping the effluent fluid and recycling the stripped fluid to the bed until the water content of the hydrocarbon fluid effluent is less than about 1 wt. percent; and passing the light hydrocarbon fluid through the bed of sieves in the vapor phase while increasing the bed temperature up to as high as 600° F., introducing the hydrocarbon fluid effluent from the bed into the stripping column, stripping the fluid and recycling the stripped hydrocarbon fluid to the bed.

6. The method of claim 5 further characterized in that after the water content of the hydrocarbon effluent is less than about 1 percent by weight, the bed temperatures are increased at a rate not exceeding about 25° F. per hour to maintain the water content of the hydrocarbon effluent below about 1 percent by weight.

7. The method of claim 6 further characterized in that the water content of the regenerated sieves is less than about 3 percent by weight.

References Cited

UNITED STATES PATENTS

| 3,075,023 | 1/1963 | Garrison et al. | 252—420 |
| 3,330,778 | 7/1967 | Irvin | 252—420 |

PATRICK P. GARVIN, *Primary Examiner.*

U.S. Cl. X.R.

252—420